United States Patent [19]

Merritt

[11] 4,114,448
[45] Sep. 19, 1978

[54] SERVICING APPARATUS

[76] Inventor: Joseph E. Merritt, 8061 8th St., Buena Park, Calif. 90621

[21] Appl. No.: 722,777

[22] Filed: Sep. 13, 1976

[51] Int. Cl.² .................. G01K 7/22; G01L 9/00
[52] U.S. Cl. .................. 73/362 AR; 73/714; 73/753; 62/129
[58] Field of Search .......... 73/17 A, 339 R, 362 AR, 73/398 R; 62/125, 127, 129

[56] References Cited

U.S. PATENT DOCUMENTS

| 3,082,951 | 3/1963 | Kayan | 62/127 X |
| 3,589,168 | 6/1971 | Hankinson et al. | 73/17 A |
| 3,707,851 | 1/1973 | McAshan, Jr. | 62/125 |
| 3,713,337 | 1/1973 | Stroman | 73/398 R X |
| 3,729,949 | 5/1973 | Talbot | 62/127 X |
| 3,911,746 | 10/1975 | Spangler et al. | 73/362 AR X |
| 3,939,459 | 2/1976 | Hoopes | 73/362 AR X |

Primary Examiner—Richard C. Queisser
Assistant Examiner—John P. Beauchamp
Attorney, Agent, or Firm—Francis X. LoJacono, Sr.

[57] ABSTRACT

The disclosed apparatus is presented, for ease of comprehension, in terms of apparatus for servicing refrigeration systems, the disclosed apparatus using readily obtainable temperatures, rather than using the prior-art method of breaking into a refrigeration line for the purpose of measuring pressures.

An added feature is the ability of the apparatus to provide either absolute temperature read-outs for the temperature at the desired locations, or a differential temperature read-out for the temperatures between two desired locations. Moreover, the disclosed apparatus permits vacuum read-outs and pressure read-outs, again without the necessity of breaking into the refrigeration lines.

Since various refrigeration systems use different refrigerants, the disclosed apparatus also has the ability to convert the temperature read-outs to pressure read-outs that are associated with specific refrigerants.

In addition, the disclosed apparatus permits the automatic charging or bleeding of a refrigeration system that has an undercharge or an overcharge of refrigerant.

8 Claims, 12 Drawing Figures

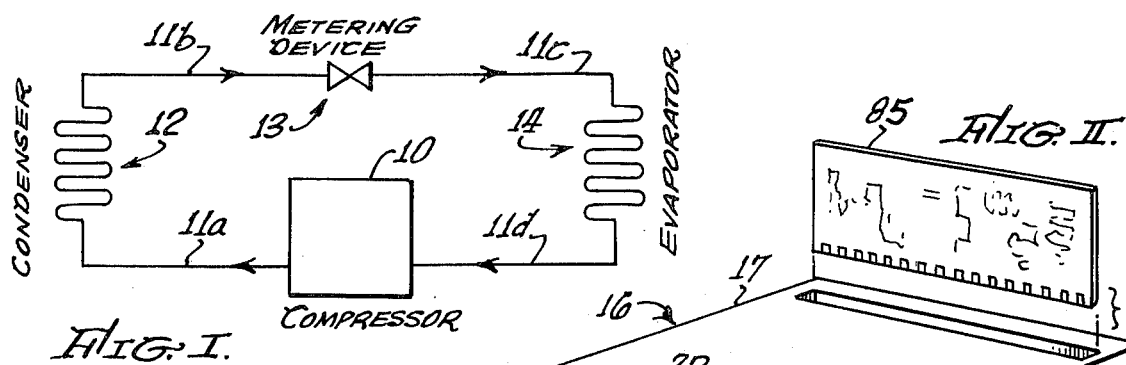
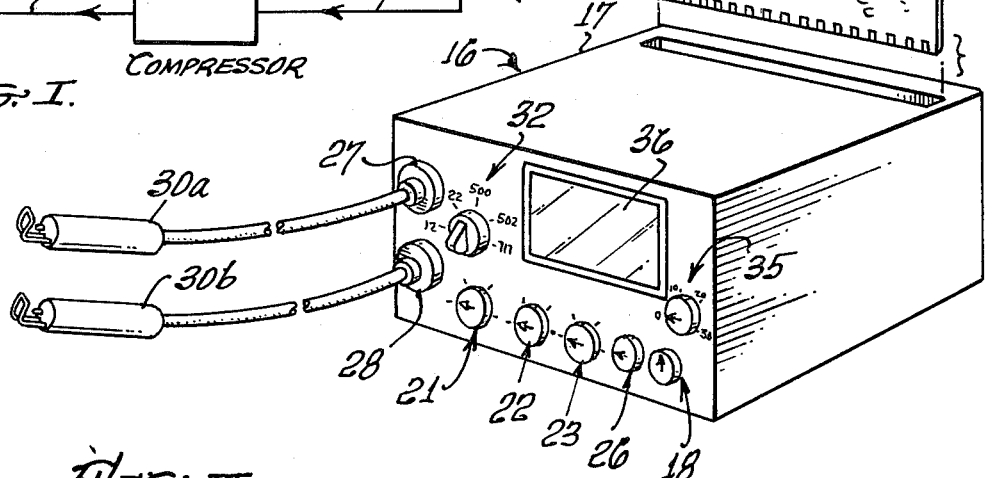
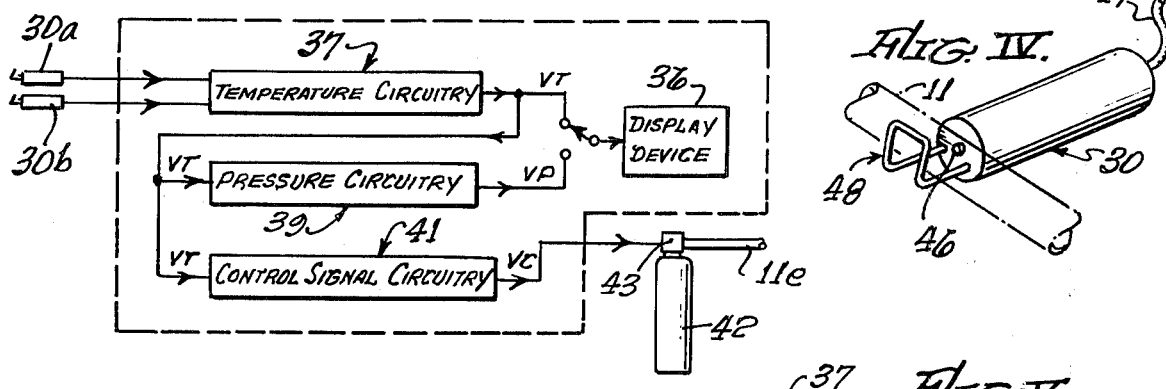
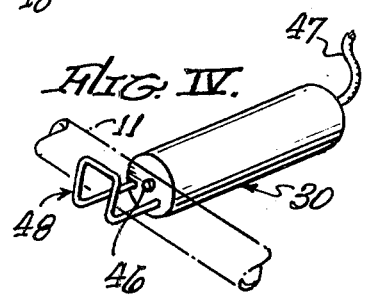
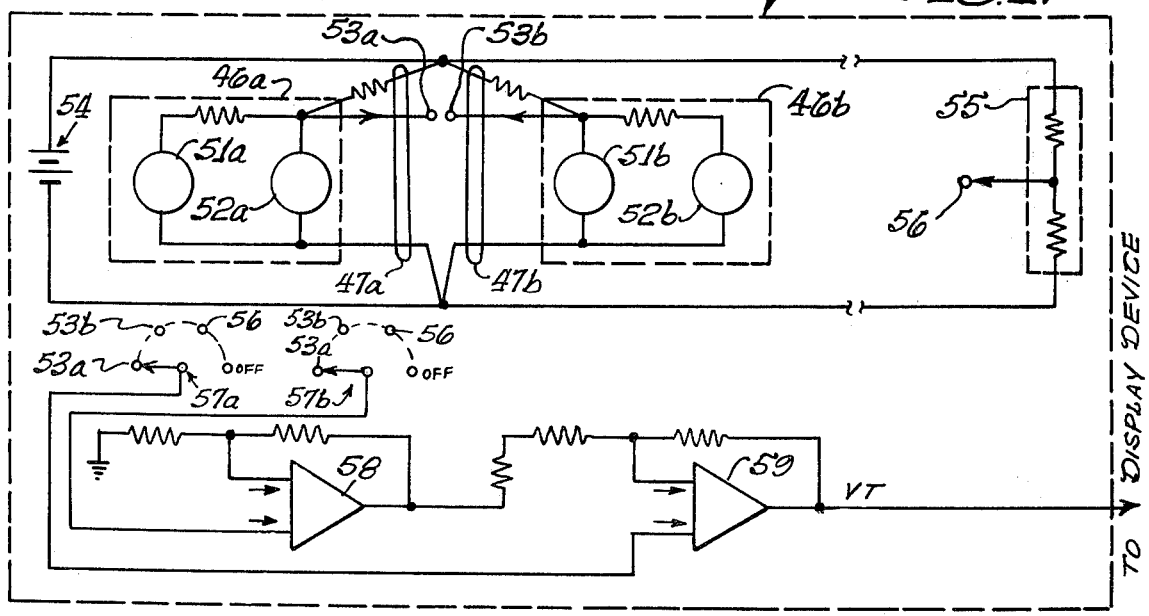

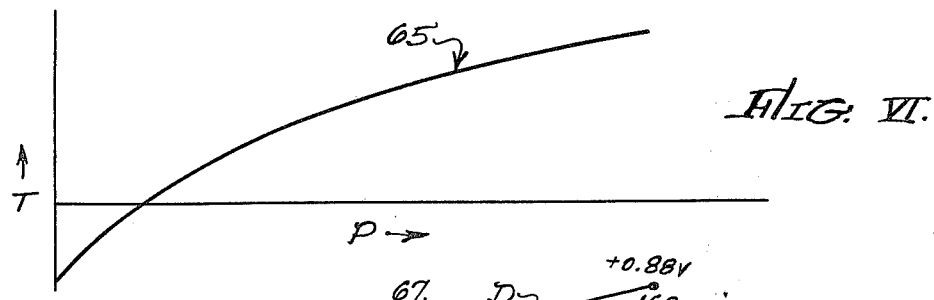
FIG. VI.
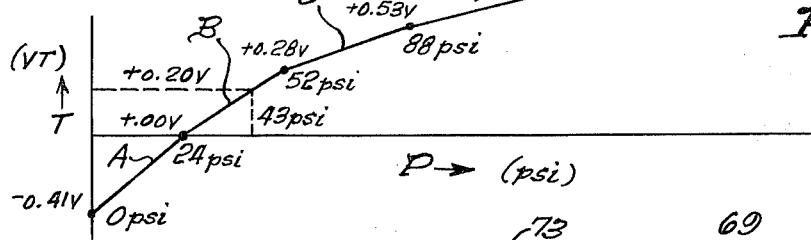
FIG. VII.
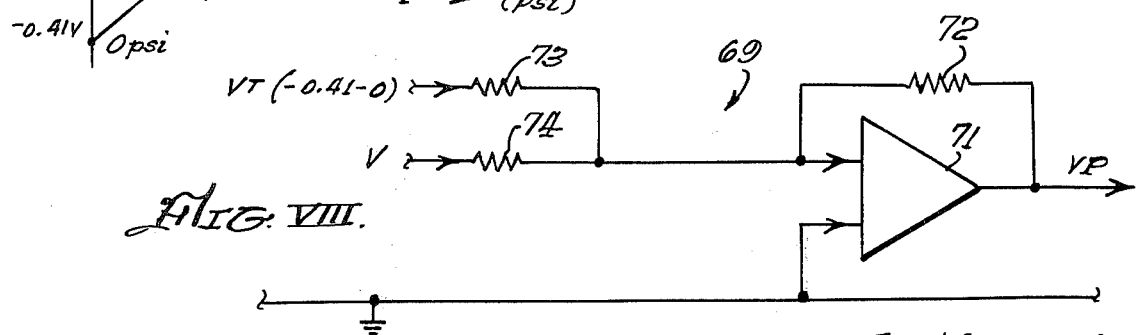
FIG. VIII.
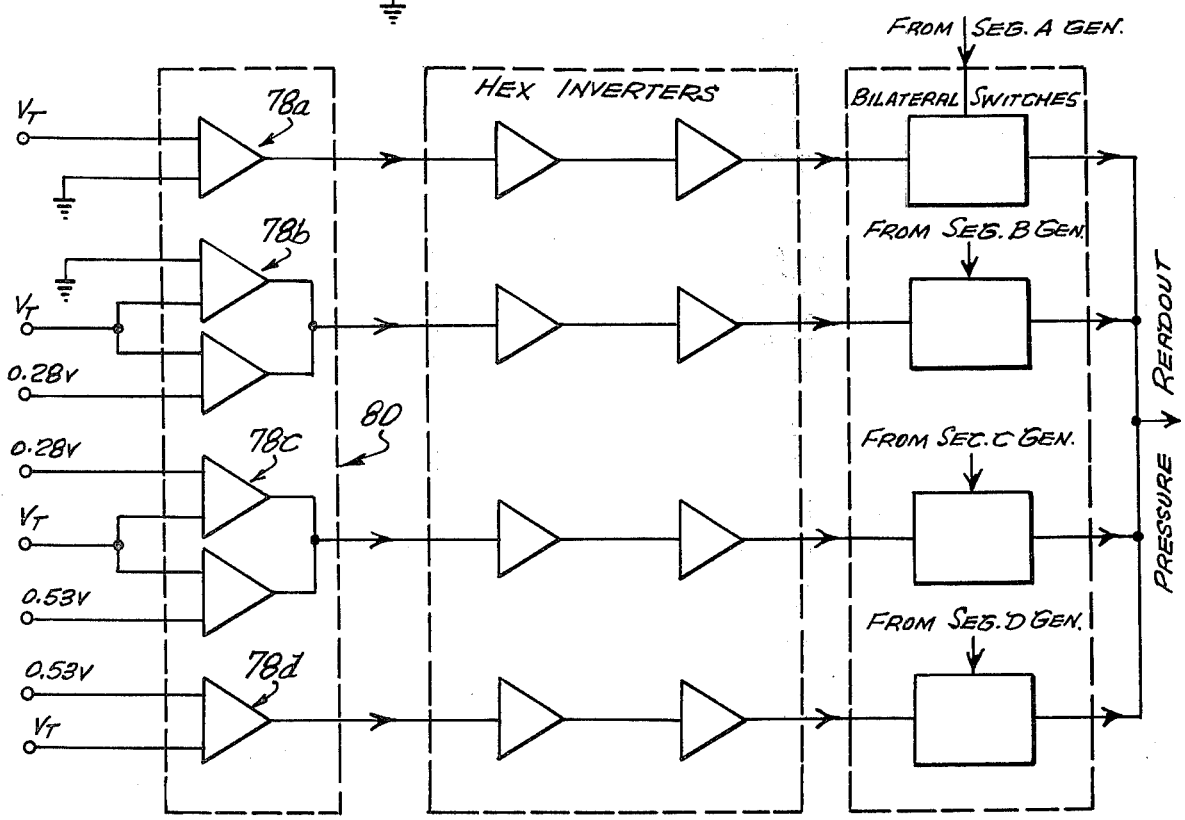
FIG. IX.

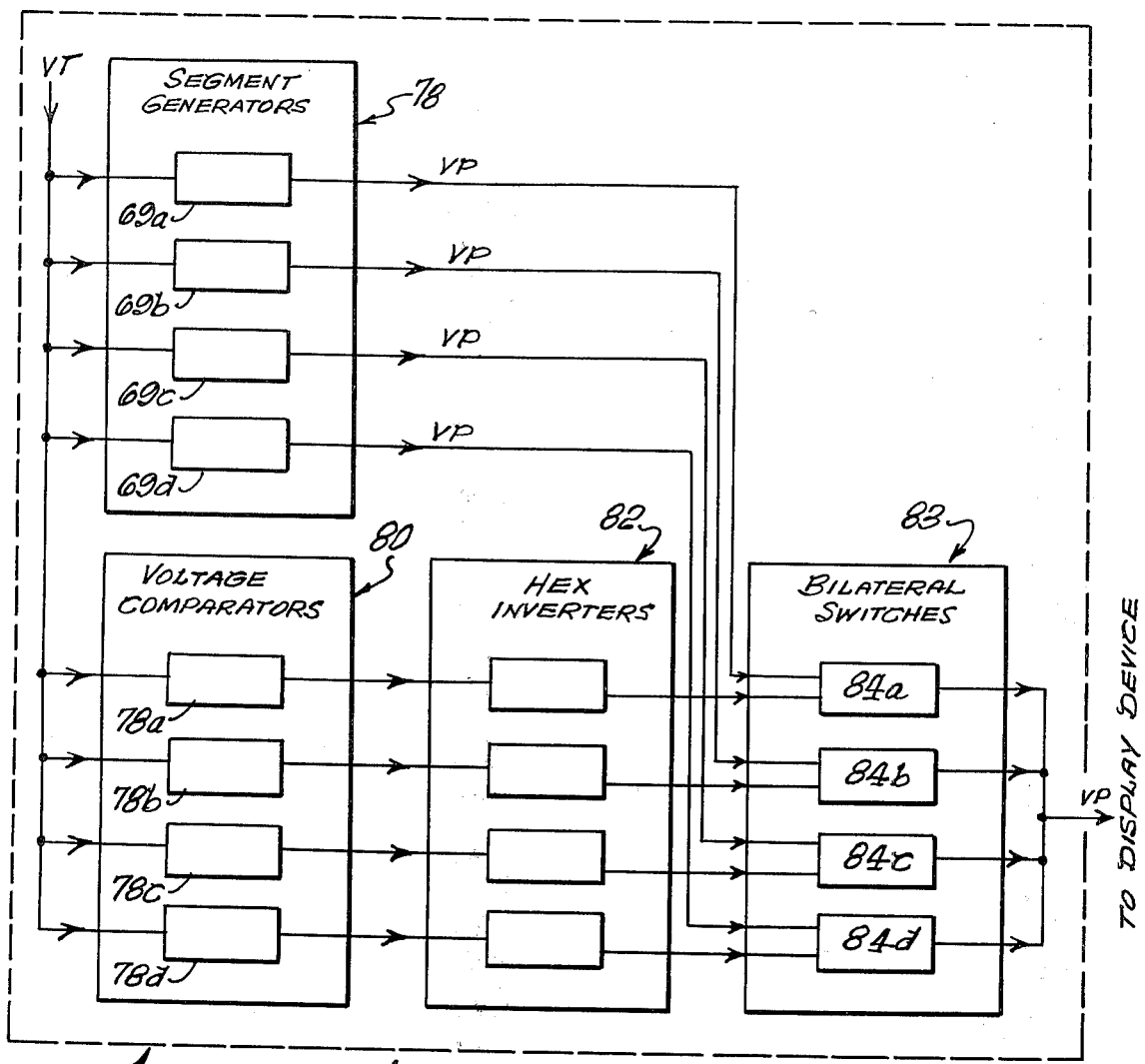
FIG. X.
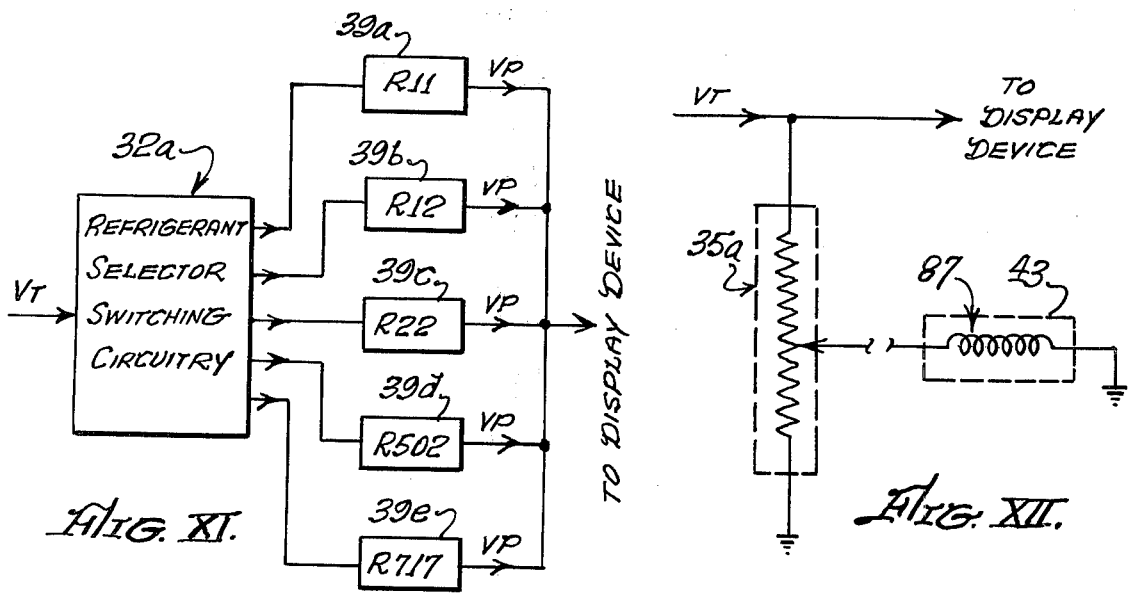
FIG. XI.
FIG. XII.

SERVICING APPARATUS

BACKGROUND

As will be pointed out in the following discussion, the present invention is adapted for use with cooling apparatus, heating apparatus, temperature measurements, pressure measurements, and a wide variety of interrelated functions; but, in order to disclose the invention's range of possible uses, the presentation will be made in terms of a refrigeration system — but this is not to be construed as a limitation.

Refrigeration systems are widely used for freezing, for air-conditioning, for food storage and display, for beverage dispensers, and for numerous other uses. As a result of these many uses, and the importance that they have to modern life, it is becoming progressively more important to properly service this type of apparatus. Unfortunately, the refrigeration-servicing industry has not kept abreast of improving technologies — and, as a result, the refrigeration serviceman is still hampered by outdated equipment for testing, diagnosing and servicing refrigeration systems.

There is, therefore, a tremendous need for updated apparatus for use in the field of refrigeration servicing.

OBJECTIVES AND DRAWINGS

It is, therefore, the principal objective of the present invention to provide improved servicing apparatus.

It is another objective of the present invention to provide improved apparatus for diagnosing the operation of refrigeration systems.

It is still another objective of the present invention to provide improved apparatus for servicing refrigeration systems.

It is a further objective of the present invention to provide improved apparatus for identifying the refrigerant used in a refrigerating system.

It is a still further objective of the present invention to provide improved apparatus for automatically normalizing the refrigerant in a refrigeration system.

The attainment of these objectives and others will be realized from a study of the following specification taken in conjunction with the drawings, of which:

FIG. I shows a typical basic refrigeration system;

FIG. II shows a typical external appearance of a unit containing the disclosed invention;

FIG. III shows a typical block diagram incorporating the principles of the present invention;

FIG. IV shows a typical probe;

FIG. V shows a typical temperature circuitry;

FIG. VI shows a typical refrigerant pressure/temperature graph;

FIG. VII shows a segmented pressure/temperature curve that matches the pressure/temperature graph of FIG. VI;

FIG. VIII shows a typical segment generator;

FIG. IX shows a typical set of voltage comparators;

FIG. X shows a typical pressure circuitry;

FIG. XI shows a typical refrigerant-selector circuitry;

FIG. XII shows a typical control-signal circuitry.

SYNOPSIS

Broadly speaking, the disclosed apparatus comprises clamp-on devices and electronic circuitry for providing a temperature signal corresponding to the temperature at a desired location, for providing a differential temperature signal corresponding to the difference in temperatures between two desired locations, and for converting a temperature signal to a pressure signal corresponding to the pressure at a desired location, or between desired locations.

The temperature/pressure converting electronic circuitry comprises a set of segment generators for synthesizing a segmented curve that has been matched to an original continuous temperature/pressure graph; so that the resultant pressure signal corresponds to the temperature signal with the same relationship defined by the original continuous graph. Other electronic circuitry permits the substitution of a different set of segmented generators that correspond to a different continuous temperature/pressure graph for a different refrigerant.

Another electronic circuit establishes a desired relation between a dial setting and the temperature signal, and produces and terminates a control signal in accordance with this relation.

INTRODUCTION

The basic refrigeration system comprises the typical closed loop shown in FIG. I. Here, a motor-driven compressor 10 compresses a refrigerant to take the form of a high-pressure hot gas, this hot-gaseous refrigerant moving along a suitable tubing 11a to a unit known as a condenser 12. Here, the hot-gaseous refrigerant is cooled (by the use of normal convection of ambient air, by the use of forced air blown through the condenser 12, by the use of a fan, by the use of cooling water, by the use of a heat exchanger, or the like). The cooling action at condenser 12 causes the formerly-hot-gaseous refrigerant to take the form of a warm-liquid refrigerant (i.e., the hot gas is "condensed" to a warm liquid). The warm-liquid refrigerant now traverses another section of tubing 11b to a metering device 13 that may take any of a number of forms, the metering device 13 passing (metering) a controlled quantity of warm-liquid refrigerant. As the warm-liquid refrigerant passes through the metering device 13, the liquid refrigerant expands, and becomes a combination of liquid and gas — the liquid/-gas refrigerant not being adapted to absorb heat. The liquid/gas, gaseous refrigerant is conducted by another section of tubing 11c to a unit known as an evaporator 14 that is positioned in the environment to be cooled — whether this environment be a refrigerator, a freezer box, an air-conditioner, or the like. As the gaseous refrigerant in evaporator 14 absorbs heat from its environment, the gaseous refrigerant becomes warmed and is sucked back, through another section of tubing 11d into the compressor 10 to repeat the above-described cycle.

There are many textbooks on refrigerating systems; and additional details may be obtained from any of these, two particularly good books being "Modern Refrigeration and Air-Conditioning" published by the Goodhart-Willcox Co., Inc., and "Doolin's Trouble-Shooter's Bible" published by Doolco, Inc.

Since the refrigerant is usually under a pressure or a suction condition, it is preferable that the tubing 11 be a workable metal. Moreover, since heat must flow to the refrigerant (in the evaporator 14), and heat must flow from the refrigerant (in the condenser 12), these units preferably comprise metal tubing. Thus, metal tubing best satisfies the needs of the refrigeration system.

It will be understood from the above simplified explanation that the refrigeration system is primarily a heat-transfer system; that is, the refrigeration system transfers heat from a first environment (say a refrigerator) — via the evaporator — to a second environment (the compressor and condenser) to a third environment (the ambient atmosphere, cooling water, etc.) where heat is not objectionable.

It will be realized that the temperature of the refrigerant changes during its passage through the compressor 10, through the condenser 12, through the metering device 13, and through the evaporator 14, and — to a more limited extent — during its passage through the various sections of tubing 11 of the refrigeration system.

Therefore, the temperature readings — both absolute and relative — at the various portions of the refrigeration system are an indication of how well the system is operating; and such temperature readings are, therefore, a primary consideration for testing, diagnosing and servicing the refrigeration system.

Due to the use of metallic tubing, the actual temperature of the refrigerant at any given location of the refrigeration system is substantially identical with the temperature of the metal tubing at that same location of the refrigeration system. Therefore, the temperature of the refrigerant is readily available at the outside surface of the tubing.

Unfortunately, it has always been a difficult problem to measure the temperatures of a refrigeration system, some of the reasons being as follows. The really-good thermometers tend to be relatively expensive and relatively fragile; it was frequently difficult to fasten the thermometer in such a way as to obtain accurate refrigeration-system-temperature readings; portions of the refrigeration system were often positioned in dark, inaccessible locations where it was difficult to read the thermometers; if the thermometer was left affixed to the apparatus, it became grimy and unreadable by the next visit — if indeed it had not been purloined by then.

As a result of these thermometer problems, temperature readings tended to be ignored.

Digression

A slight digression is desirable at this point. It is well known that there are predictable relations between the pressure, the volume, and the temperature of a gas, these predictable relationships being known as the "gas laws". Since there are such known relationships, servicemen — rather than trying to measure the temperature of the refrigerant in a refrigeration system — learned to measure and use pressure readings.

The use of pressure measurements purported to have a number of advantages, among which were the following. Pressure gauges were relatively rugged; they were fairly accurate; each serviceman could have a complete set of pressure gauges; etc. As a result, the refrigeration-servicing industry matured on the use of pressure gauges.

Unfortunately, the use of pressure gauges introduced a number of difficulties that were not always recognized, or compensated for. For example, pressure gauges are handled roughly, and are frequently out of calibration; pressure readings require different pressure gauges than suction readings; there are pressure drops along the tubing, but these are unmeasureable — and have to be estimated. Furthermore, many manufacturers of refrigeration systems limited their costs by omitting connections that accepted the pressure gauges. Therefore, the refrigeration serviceman frequently had to install a so-called "Schrader valve" that would accept the pressure gauge, and would still permit the refrigeration system to function properly — this relatively expensive Schrader valve becoming a permanent part of the installation.

One serious disadvantage involved in the use of pressure gauges is the installation of the Schrader valve. The installation requires that the refrigeration system be evacuated of refrigerant; the tubing be suitably cut; the valve fitted; the valve soldered in place; the refrigerating system be evacuated of humid air; and the refrigeration system then refilled with refrigerant. All of this work is necessary to provide a Schrader valve for insertion of a pressure gauge.

Another disadvantage involved in the use of pressure gauges is that, when the copper tubing is soldered — as in the installation of a Schrader valve — the soldering operation inherently produces copper oxide within the copper tubing; and this material has a tendency to flake off, and clog filters and the metering device.

Still another disadvantage involved in the use of pressure gauges is that they must often be attached to the suction line of the refrigeration system; and, when this is done — even with the use of a Schrader valve — there is a tendency for the refrigeration system to ingest water vapor from the relatively humid ambient atmosphere. Unfortunately, such moisture is inimical to refrigeration systems because (1) it forms hydrochloric acid that erodes metal, and (2) it tends to freeze in the small orifice of the metering device — which is the coldest point of the refrigeration system — and thus causes system malfunction.

A further serious disadvantage in the use of pressure gauges occurs when they are connected to the high-pressure side of the system, or to a system that has been overfilled with refrigerant, or (often) to a system that contains the wrong refrigerant. In such cases, the simple act of threading the pressure gauge into the Schrader valve causes the serviceman to run the risk of a momentary spurtage of refrigerant; and, if this refrigerant strikes the serviceman, it could produce localized freezing, eye damage, or the like.

As will be shown later, the present invention obviates all of the above disadvantages associated with the pressure gauges and pressure measurements; and provides pressure data without breaking into the refrigeration system.

It may thus be understood that, while the number of refrigeration systems has increased tremendously, the techniques for servicing them are about the same as 40 years ago.

Typical External Appearance

FIG. II shows a typical appearance of a unit 16 for housing the subject invention. This comprises a case 17; a zero-setting knob 18; a set of display-selection switches 21, 22 and 23; an ON/OFF switch 26; a pair of probe sockets 27 and 28; a refrigerant-selector switch 32 (which may alternatively take the form of one or more plug-in sockets); a super-heat-selection dial 35; and a display device 36 (which is preferably a digital voltmeter such as model DM350 manufactured by the Datel Systems, Inc., of Canton, Mass.) — because this display device accepts analog signals and produces a digital read-out having a range from −1999 to +1999, with a positionable decimal point. The present unit 16 is battery operated, and is therefore self-contained; but — alternatively — it may comprise means for recharging the battery, or may comprise a power cord (not shown) for connection to an external source of power.

The Block Diagram

As indicated above, the present invention permits the use of temperatures for testing, diagnosing and servicing refrigeration systems. FIG. III shows a pair of probes 30 that produce probe signals that correspond to the temperature of selected probe environments of the refrigeration system; and temperature circuitry 37 converts the probe signals to temperature signals (VT) that are suitably scaled to produce temperature read-outs on display device 36. As will be shown later, the temperature read-outs indicate either the absolute temperature at the probe environment, or indicate the difference in temperatures (temperature differential) at the probe environments. In this way, the temperature read-outs permit the serviceman to quickly and conveniently analyze the operation of the refrigeration system — without the need for breaking into the tubing network with one or more pressure gauges.

However, many refrigeration servicemen are conversant with the use of pressure gauges; and the present invention uses pressure circuitry 39 to convert the temperature signals (VT) into pressure signals (VP) that produce pressure read-outs on display device 36. In this way, the pressure read-outs permit the serviceman to quickly and conveniently analyze the operation of the refrigeration system — without the need for breaking into the tubing network with one or more pressure gauges.

Moreover, since the indicated read-out device permits the use of positive and negative polarity signs, the resultant pressure read-out can indicate vacuum as, for example, "−20" inches of mercury.

The present invention, by use of a control-signal circuitry 41, also produces a control signal (VC) that permits the automatic addition or removal of refrigerant.

The Probe

As indicated above, the disclosed invention permits measurement of the refrigerant temperature at any desired location of the refrigeration system; and this measurement is achieved by means of one or more probes 30. A typical probe 30 is shown in FIG. IV. Here, the probe handle is shown to contain a temperature-sensitive module 46 (such as a temperature-sensitive thermistor) that may have a temperature range of about −100° F. to 212° F.; a platinum temperature-sensitive module having a temperature range of about −340° F. to about 600° F., or other temperature sensors. An electric probe cable 47 transmits the electric probe signals from the temperature-sensitive probe module 46 to temperature circuitry 37 discussed above, and will be more fully discussed later.

Probe 30 is also shown to have a wire-clamping arrangement 48 that is spring-loaded in such a way that the probe head assembly may be clamped onto a refrigeration-system tubing 11, indicated in dashed lines. Either the temperature-sensitive module 46 and/or the wire-clamping arrangement 48 may be spring-loaded and/or retractable in any suitable manner; so that the temperature-sensitive module 30 is pressed securely against a desired portion of the refrigeration-system metal tubing.

It will, of course, be recalled that the temperature of the refrigerant is substantially identical to the temperature at the outer surface of the metal tubing; so that the probe signal corresponds with the refrigerant temperature.

The Temperature Circuitry

For convenience and clarity of illustration, the power-supply, biassing voltages and other empirical connections have been omitted; as these are known to persons skilled in the electronics art. The following temperature circuit 37 of FIG. V has been found useful for converting the probe signals to temperature readings.

As indicated above, the probe 30 contains a temperature-sensitive module 46; and FIG. V shows two temperature-sensitive modules 46a and 46b (such as type 44018 made by the Yellow Spring Instrument Corporation of Yellow Springs, Ohio) to contain two balanced thermistors, 51 and 52, and a suitable resistor network — these thermistor modules 46a and 46b having been engineered for use in a Wheatstone Bridge circuit, such as shown in FIG. V. The probe signal from the thermistor module 46a of probe 30a is available at terminal 53a, and the probe signal from the thermistor module 46b of probe 30b is available at terminal 53d, the Wheatstone Bridge circuit detecting very small changes of the probe signals.

Alternatively, the temperature-sensitive module may comprise platinum sensors such as types 110MA, 118G, 118MF, 146MA made by Rosemount Inc. of Chatsworth, Calif.

The battery 54 is preferably one of the mercury-type batteries used for electronic watches; as its size, voltage, and life are suitable for the disclosed use — these batteries having the additional advantage that their output voltage remains at a substantially constant value for their entire lifetime, rather than diminishing with age.

Incidentally, the probe cable 47 of FIG. V requires only a wire for carrying the probe signal, and two wires for power connection to the battery.

FIG. V also shows a voltage divider 55 connected across the same battery 54 as the Wheatstone Bridge, the tap of the voltage divider producing a stable reference-voltage signal that is available at terminal 56.

The probe-signal voltage and the reference voltage are used as follows. The probe signal from probe 30a and from 30b coact to produce a signal that corresponds to the temperature difference between the probe environment; whereas the probe signal from either probe coacts with the reference signal from the voltage divider to produce a signal that corresponds to the absolute temperature at the probe environment. The probe signal at terminals 53a, 53b and 56 may be combined by switches 57a and 57b, as indicated; so that any desired combination of probe signals and reference voltages may be obtained, this simplified switching arrangement being somewhat different than the switching arrangement indicated in FIG. II.

In order to provide suitable amplification, improved impedance matching, and other desirable electronic characteristics, the switched signals may be applied to differential amplifiers 58 and 59 (such as Mini Dip type 741 made by National Semi Conductor Co. of Santa Clara, Calif.), the output of these amplifiers being a suitably scaled temperature signal (VT) that is applied to the display device 36, which thereupon provides a suitable display that indicates the temperature at or between the selected probe environment.

The above-mentioned digital voltmeter has the advantage that it accepts the analog-temperature signal VT, and displays a lighted digital temperature read-out.

The resultant temperature read-out has an accuracy of plus or minus 0.1° F. — or plus or minus 0.1° C., if desired — when the circuit parameters are properly selected.

While the disclosed digital voltmeter has a number of advantages such as portability, etc., other display devices — such as liquid-crystal displays, recorders, charts, analog read-outs, etc., may alternatively be used.

As indicated above, there should be a given temperature or a temperature difference at or across the various elements of a properly operating refrigeration system; and the disclosed invention permits the easy measurement of such temperatures and temperature differences, by merely clamping the probes to the desired locations. Thus, the disclosed invention permits an easy and simple measurement of the temperature across the compressor, across the evaporator, across the condenser, across any portion of the tubing, or at any desired location of the refrigeration system, the temperature read-out being produced in about 0.5 seconds.

There are times when it is desirable to know the ambient temperature, the temperature of the air being blown into or from the evaporator or the condenser, etc. To make such temperature measurements, one probe is positioned in the desired environment; and the switches 57 are suitably set. Now, the absolute temperature of that particular probe is displayed by the display device 36.

There are other times when it is desired to know the wet-bulb depression, which is the difference between the reading of a normal dry thermometer and a thermometer having a bulb enclosed by a wet cloth. The present invention provides this wet-bulb reading by wrapping one of the probe heads in a wet cloth, holding the two probe heads together, and exposing the probes to the air. The ambient air cools off the wet probe; and the display device 36 shows the probe differential — i.e., the wet-bulb depression.

The Pressure Circuitry

It was pointed out previously that many refrigeration servicemen have become trained to work with pressure gauges; and the present invention is, therefore, adapted to display pressure data — rather than temperature data — when so desired. This result is achieved by converting the temperature signal VT into a corresponding pressure signal VP; the following pressure circuitry has been found useful.

In FIG. III, the block diagram indicates that block 39 represents the pressure circuitry; and it will be seen that the previously discussed temperature signal VT is applied to the pressure circuitry 39 — the temperature signal VT being treated in such a way that the display device 36 presents a pressure read-out.

The Pressure/Temperature Graph

Another digression is desirable at this time. FIG. VI shows a typical pressure/temperature (P/T) graph 65 for a refrigerant. The interpretation to be obtained from the P/T graph 65 of FIG. VI is that in a closed refrigeration system there is a specific pressure (P) associated with each specific temperature (T). Thus, if one of these factors is known, the other factor may be obtained from the P/T graph 65 of FIG. VI — although commercially available P/T charts are more convenient for providing the P or the T correlation for various refrigerants.

It has been shown that the present invention measures the temperature of a refrigerant, through the metal walls of the tubing, at a selected probe location; and displays the temperature read-out at that location — but, alternatively, may display a positive or a negative pressure read-out corresponding to that temperature, just as though a pressure gauge had been inserted into the refrigeration system at that particular location. The present invention achieves this result as follows.

The Matching Segmented P/T Curve

In FIG. VII, the previous continuous P/T graph 65 of FIG. VI has been matched by a series of four straight-line segments A, B, C and D, these segments forming a matching segmented P/T curve 67. If more than four straight-line segments are used, the matching will be improved; but it has been found that four segments over the desired working range of the P/T curve 67 provide a correlation of plus or minus 0.1 pounds per square inch gauge pressure (p.s.i.) — and this is sufficiently accurate for the present purpose. An even better correlation may be achieved, if desired, by using more segments.

In FIG. VII, the matching segment P/T curve 67 has had its temperature axis and its pressure axis scaled to the temperatures and the pressures read-outs that are expected to be displayed.

It will be noted that the right-hand portion of the original continuous P/T graph 65 of FIG. VI is not changing rapidly; that is, it is relatively "linear" — so that a relatively long straight-line segment (D) may be used for matching. On the other hand, the knee portion of the original continuous P/T graph 65 of FIG. VI is changing rapidly; so that a number of relatively short segments (B and C of FIG. VII) are desirable for matching. Furthermore, the left-hand portion of the original continuous P/T graph 65 of FIG. VI is fairly linear — and, moreover, contains two so-called "zero-intercept points" (points where the P/T graph 65 intercepts the temperature axis and the pressure axis). These zero-intercept points are accurately obtained from the well-known P/T charts; and it is extremely convenient to use these zero-intercept points as the end points of segment A.

In this way, the original continuous P/T graph 65 of FIG. VI may be readily matched by the matching segmented P/T curve 67 of FIG. VII, which includes the numerical values for the end points of the various segments — for reasons that will become apparent later.

The segments A, B, C and D — and the actual number of segments — may be selected in any of a number of different ways. First of all, the mathematical procedure known as "linear regression" may be used. Alternatively, a straight edge may be used to match as long a section of the original continuous P/T graph 65 as possible. Thirdly, empirical and/or mathematical "least square" methods may be used.

Once a matching segmented curve has been selected, testing should then be used to determine whether the matching segmented P/T curve 67 of FIG. VII is satisfactorily accurate; otherwise, the number and/or the slope and/or the location of the segments must be rectified.

In any case, the matching segmented P/T curve 67 of FIG. VII comprises a plurality of segments — each having an individual slope, and individual end points.

For convenience, the temperature signals VT have been scaled so that −0.41 volts, +0.28 volts, +0.53 volts, +0.88 volts, etc., correspond to −41° F., +28°

F., +53° F., +88° F., etc. A similar scaling has been used for the pressure signals.

The Segment Generators

It was pointed out above that the matching segmented P/T curve 67 of FIG. VII comprises a set of four straight-line (linear) segments, each of these having an individual slope and individual end points, adjacent segments having adjacent substantially coterminous ends and substantially identical end points.

It is well known in the electronics art to design a "linear" amplifier whose output waveform contains a straight-line (linear) portion having a desired slope; and many such linear amplifiers are known and widely used. Therefore, such linear amplifiers may be used to generate response waveforms that contain the above-discussed segments A, B, C and D.

FIG. VIII illustrates a linear-amplifier circuit, or segment generator 69, that has proved to be extremely satisfactory for generating the disclosed segments. This circuit 69 uses an operational amplifier 71 (such as type LM 4741 made by National Conductor Co.) having a feedback resistor 72 controlling the slope of the linear output waveform of segment generator 69. A fixed voltage (V) and a summing network, comprising resistors 73 and 74, assure that the linear-output waveform of segment generator 69 passes through the desired end points of given segments.

Thus, as the temperature signal VT is applied to the input of segment generator 69, the segment generator 69 converts the input-temperature signals VT to output-pressure signals VP, the conversion being a straight-line conversion corresponding to a segment of FIG. VII.

Since the segment generator 69 discussed is typical, the use of a suitable fixed voltage and suitable valued resistors would produce a segment generator 69a whose response included a segment A of the segmented P/T curve 67 of FIG. VII.

Similarly, the use of other suitable valued fixed voltages and resistors would produce other segment generators 69b, 69c and 69d whose responses would include portions that corresponded to the other segments B, C and D of the matching segmented P/T curve 67 of FIG. VII.

In this way, a set of four segment generators 69a, 69b, 69c and 69d generate output waveforms having straight-line portions corresponding to the four segments A, B, C and D.

Referring back to the matching segmented P/T curve 67 of FIG. VI, it will be realized that a given temperature—say 20° F.—should be transformed (by the probe 30 and the temperature circuitry 37) to a given temperature signal VT—say 0.20 volts; and that the second segment generator 69b should produce a corresponding pressure read-out of 43 p.s.i.

The Voltage Generators

In FIG. IX, a plurality of four voltage comparators 78a, 78b, 78c and 78d (such as type L 311 made by National Semi Conductor Co.)—whose functions will be discussed later—are connected as indicated, these comprising either single-ended or double-ended amplifiers. The illustrated electrical connections and applied voltages are such that, when the temperature signal VT has a value that falls within the range of one of the segments A, B, C or D of FIG. VII, only the corresponding voltage comparator 78a, 78b, 78c or 78d produces an output signal. In this way, a representative temperature signal of +0.20 volts indicated in FIG. VII would cause only the second voltage comparator 78b to produce an output signal.

Thus, the set 80 of voltage comparators 78 continuously monitors the incoming temperature signal VT, and assures that an output signal is produced only by the particular voltage comparator 78 whose range includes the instantaneous value of the incoming temperature signal VT.

As shown in FIG. X, the output signals from the set 80 of voltage comparators are connected through a set 82 of hex inverters (such as model N7404 made by the Signetics Co. of Sunnyvale, Calif.) to a set 83 of bilateral switches 84a, 84b, 84c and 84d (such as model 4016A made by the Signetics Co.—this module comprising four such switches). The set 82 of hex inverters is used for the purpose of signal inversion, impedence matching, and other electronic considerations; whereas the four bilateral switches 84 function as an AND circuit or as a coincidence switch. Their operation is such that a pressure signal VP from a segment generator 69 is transmitted only when a suitable signal from a corresponding voltage comparator 78 is present and is applied simultaneously with the pressure signal from a corresponding segment generator. In this way, the circuitry synthesizes a matching curve.

Thus, a representative temperature signal of +0.20 volts (of FIG. VII) would cause only the second segment generator 69d to produce a pressure signal; and the display device 36 displays the pressure read-out 43 p.s.i.

In this way, a given temperature signal VT causes the disclosed circuitry to produce a given pressure signal VP that corresponds with the relationship defined by the matching segmented P/T curve 67 of FIG. VII.

Refrigerant Selector Circuitry

Since refrigeration loads vary tremendously in many respects—size, time requirements, temperatures to be obtained, temperature of the cooling air or water, etc.—the resultant refrigeration systems also vary a great deal; and some of these refrigeration systems are designed to operate with refrigerants having characteristics that are quite different from other refrigerants. As a result of these differences between refrigerants, the following refrigerants have become accepted as the safest to be ordinarily used: R12, R22, R500, R502 and R717.

As a result of the differences between refrigerants, each refrigerant has its own individual continuous P/T graph. These individual continuous P/T graphs bear a similarity to other continuous P/T graphs of the other refrigerants—as exemplified by the P/T graph 65 of FIG. VI—but have their own individual values, curvatures, zero intercepts, etc.

As a matter of interest, the continuous P/T graph 65 of FIG. VI is the P/T graph for the refrigerant R22.

It was pointed out above (1) that each refrigerant has its own individual continuous P/T curve; (2) that the continuous P/T curve of a refrigerant may be closely matched by a matching segmented P/T curve; and (3) that the end points and the slopes of the segments of the matching segmented P/T curve may be readily achieved by a set of suitable segment generators. Therefore, a matching segmented P/T curve for any desired refrigerant may be achieved by utilizing a set of suitable generators having suitable circuit parameters.

If the disclosed apparatus is to be used for servicing only refrigeration systems that use the same refrigerant, the required set of segment generators may be incorporated into the design of the disclosed apparatus, as explained above. However, if the disclosed apparatus is to be used for servicing various refrigeration systems which use a variety of refrigerants, the different required set of segment generators may be conveniently provided by an individual segment generator module—comprising printed wiring, integrated circuits, chips, etc.; so that a module 85 having the required set of segment generators may be plugged into a suitable socket as indicated in FIG. II, the socket and module being suitably wired to provide the necessary voltages, etc.

Alternatively, the servicing unit 16 of FIG. II may comprise a refrigerant-selector switch 32 that modifies the operation of a built-in set of segment generators by providing different resistors, fixed voltages, biases, feedback circuits, etc.; or by switching different segment generators into the pressure circuitry; or by switching in individual pressure circuitries 39—as indicated in FIG. XI.

Refrigerant Identification

The refrigerant selector switch 32 has another extremely valuable function, as follows. It is known that each refrigeration system is designed for a particular cooling load, and is designed to use a particular refrigerant. The various refrigerants should not be mixed, since their characteristics vary widely; so, there are strong industry recommendations that each refrigeration system should be color-coded to identify which refrigerant is used.

Unfortunately, many pieces of refrigeration equipment are not color-coded; many pieces of refrigeration equipment have their color codes eroded; many pieces of refrigeration equipment are in such a location that the color codes are hidden beneath a thick coat of grime, etc. Even worse, some of the refrigeration systems have had their original refrigerant replaced with another refrigerant, in order to obtain different results.

In any case, when a serviceman had to add refrigerant, he must know which refrigerant is already in the system; and, usually, this information is not readily available to him.

The disclosed invention provides the refrigeration serviceman with a quick indication of the refrigerant in the system, in the following manner.

A probe is clamped to any suitable portion of the refrigeration system; and a temperature read-out is obtained. The refrigerant-selector switch 32 of FIG. II is cycled through its various positions, each position providing a different pressure read-out.

One of these pressure read-outs is the true pressure for the refrigerant in the system, because it is obtained by the use of the correct segmented P/T curve; the other pressure read-outs are spurious, because they are obtained by using the wrong P/T curve. The serviceman can then check the pressure/temperature chart; and the pressure/temperature values that correspond with the P/T chart identify the refrigerant that is already in the system.

AUTOMATIC CHARGING

The term "super heat" is widely used in the field of refrigeration; but, unfortunately, it has acquired several inconsistent definitions. The definition that seems to have the most usefulness, and will be used in the following presentation, is that super heat is the difference between the temperature of the refrigerant entering the evaporator 14 and the temperature of the refrigerant leaving the evaporator 14. By use of this definition, the super heat is an indication of the cooling effect produced by evaporator 14.

If a refrigeration system is operating properly, the super heat may have a value ranging up to about 30° F., depending upon the refrigerant and the design of the refrigeration system. In general, a lower-than-normal super heat reading indicates a poorly functioning system; and, if the system is otherwise satisfactory, it indicates a shortage of refrigerant—probably due to a leak in the refrigeration system.

After the system has been repaired, it becomes necessary to add refrigerant (i.e., to "charge" the refrigeration system). Charging is accomplished by connecting a refrigerant cylinder 42 of FIG. III, through a suitable control-valve arrangement 43, to the intake or suction side of the compressor 10. The new charge of refrigerant should be added very slowly; and, in large refrigeration systems, this may require as long as several hours—during which time the serviceman stands by, watching the gauges during the slow operation, and turning off the control valve 43 when the desired amount of refrigerant has been added.

In the refrigeration systems that do not have suitable connections for connecting gauges, it is necessary to weigh the amount of refrigerant that has been added to the refrigeration system; and, since the weight of the added refrigerant is quite small compared to the weight of the refrigerant cylinder, the measurement of the added charge of refrigerant is both inconvenient and inaccurate.

The disclosed invention is adapted to automatically charge the refrigeration system, and to turn off the charging apparatus when the refrigeration system has been properly charged. The automatic charging procedure is as follows.

The switches are set to read a temperature difference; and the probes are clamped to suitable locations of the evaporator input and output tubings—the display device thus showing a super-heat read-out. The super-heat control 36 of FIG. II is set to a desired value; and, as indicated in FIG. III, the refrigerant cylinder 42 is connected by suitable tubing 11e through a solenoid-operated control valve 43 to the suction side of compressor 10.

One simple form of super-heat circuitry is indicated in FIG. XII, to comprise an adjustable super-heat voltage divider 35a connected to the temperature signal VT wire of the display device 36. In this way, the super-heat read-out voltage is impressed across the super-heat voltage divider 35a; and the slider of the voltage divider 35a picks off a given voltage.

During the condition when the super-heat read-out is low, the voltage-divider slider picks off a small voltage; and this activates the solenoid winding 87 of the control valve 43 to open the control valve—thus permitting a slow, controlled flow of refrigerant to charge the refrigeration system. As the additional refrigerant enters the refrigeration system, the system operation improves; and the super-heat reading increases—the voltage-divider slider now picking off a larger voltage. When the super-heat read-out reaches its normal value, the voltage picked off by the super-heat voltage divider 35a is large enough to deactivate the solenoid winding 87 to close the control valve 43, thus automatically terminating the charging procedure. Of course, the above simplified super-heat circuitry may be made fail-safe, if so desired.

The disclosed automatic charging arrangement has another desirable feature. Quite often, a refrigeration system breaks down on a Sunday, a holiday, during a weekend, or at other times when it is usually not particularly desirable for the serviceman to spend too much repair time on it. The serviceman can easily determine whether a shortage or leakage of refrigerant is causing the difficulty; and, if it is, he can connect the automatic charging apparatus described above—and leave. The disclosed automatic charging apparatus will recharge the system as often—and to the extent necessary—throughout the day, night, or weekend; and the serviceman can return at his convenience to make whatever permanent repairs may be necessary.

The disclosed charging arrangement may be readily modified to perform an additional function, namely the bleeding of an overfilled refrigeration system. This function is achieved (1) by using a control valve that has one passage between tubing 11e and cylinder 42 as discussed above, and has a second passage between tubing 11e and the ambient air; and (2) by using a solenoid winding that reacts differently to a high-amplitude control signal than it does to a low-amplitude control signal.

The charging operation is the same as explained above; and the bleeding operation is as follows. When the super-heat read-out is too high, the solenoid causes the control valve to complete the passage from tubing 11e to the atmosphere—thus bleeding off the excess refrigerant until the super-heat read-out is reduced to the desired value—whereupon the control valve is automatically de-activated.

In this way, the disclosed "normalizing" arrangement includes both charging and discharging operations.

There are many times when it is desirable to measure the amount of refrigerant left in a cylinder; but this is an inconvenient and inaccurate operation. The disclosed apparatus permits these measurements to be made in a very easy manner.

It should be recalled that, if the cylinder valve 43 is opened slightly to permit the continuous escape of a small amount of refrigerant, the liquid refrigerant at the bottom of the cylinder remains at substantially room temperature; whereas the gaseous refrigerant at the upper portion of the cylinder assumes a much lower temperature. One probe of the disclosed apparatus may be moved vertically to measure the temperature of the metal cylinder; and the apparatus will indicate a sharp line of temperature demarcation at the liquid/gas line—thus indicating exactly how much liquid refrigerant is left in the cylinder.

A similar measurement indicates the level of lubricating oil in the compressor; and indicates the bubble point of a capillary tube that is used as the metering device of many refrigeration systems.

Temperature monitoring, by moving the probe along the tubing, can also detect leaks, plugs, constrictions, etc., in the refrigeration system.

MISCELLANEOUS CONSIDERATIONS

The disclosed arrangement has been explained in terms of apparatus for servicing refrigeration systems; but the disclosed invention is obviously not limited to this usage. While the terms of "pressure/temperature" and "P/T", etc., have been used as part of the explanation, it is apparent that these terms are to be construed more broadly. For example, the disclosed invention lends itself to the use of other functions—such as price/sales, velocity/braking, etc., which are suitably interrelated.

Moreover, the discussion has used the term "super heat"; but this, too, is an over-specification. Other functions that are suitably interrelated may be utilized.

Furthermore, the disclosed invention may be used to measure heat transmission, insulation properties, cooling rates, heat losses, velocity differences, heat exchange, etc.

ADVANTAGES

The disclosed invention has many advantages over prior-art arrangements. First of all, it may be used for servicing, testing, and diagnosing refrigeration systems, without the necessity of having to break into the sealed refrigeration lines in order to insert a pressure gauge. Second, it is extremely quick and easy to measure temperatures, pressures and vacuums. It provides an absolute temperature read-out that corresponds with the temperature at a desired location. It provides a differential temperature read-out that corresponds with the difference of temperatures between any two desired locations. It provides a pressure or a pressure-differential read-out without the need of breaking into the refrigeration lines. It has a digital temperature read-out and pressure read-out. The display has a range limited only by the display device selected. It is adaptable for any refrigerant. It will identify the refrigerant that is in a refrigeration system. It will automatically normalize a refrigeration system that is overcharged or undercharged. It has a temperature and a pressure accuracy of plus or minus 0.1° F., plus or minus 0.1° C., or 0.1 p.s.i.g. The read-out is available in about 0.5 seconds. The unit may be completely self-contained. The unit is extremely lightweight (about half a pound) and is quite small (about 9 cubic inches). The unit is of solid-state construction, and is extremely rugged.

I claim:
1. The combination comprising:
temperature-sensitive means, comprising a positionable probe, for producing a probe-signal corresponding to the temperature of the probe-environment having a known pressure/temperature relationship;
means for transposing said probe-signal to a temperature-signal;
means for transforming said temperature-signal to a temperature readout corresponding to the temperature at said probe-environment;
alternative means for electronically converting said temperature-signal to a pressure readout corresponding to the pressure at said probe-environment;
said converting means comprising means for synthesizing a pressure/temperature curve corresponding to said pressure/temperature relationship;
said synthesizing means comprising a set of generator means for synthesizing said pressure/temperature curve.

2. The combination of claim 1, including means, comprising selector-circuit means, for substituting a different set of generator means for synthesizing a different pressure/temperature curve corresponding to a different pressure/temperature curve corresponding to a different pressure/temperature relationship.

3. The combination comprising:
- temperature-sensitive means, comprising a positionable probe, for producing a probe-signal corresponding to the temperature of the probe-environment having a known pressure/temperature relationship;
- means for transposing said probe-signal to a temperature-signal;
- means for transforming said temperature-signal to a temperature readout corresponding to the temperature at said probe-environment;
- alternative means for electronically converting said temperature-signal to a pressure readout corresponding to the pressure at said probe-environment;
- second temperature-sensitive means, comprising a second positionable probe, for producing a second probe-signal corresponding to the temperature at a second probe-environment having said known pressure/temperature relationship;
- said transposing means comprising means for transposing said second probe-signal to a second temperature-signal;
- said transforming means comprising means for transforming said second temperature-signal to a second temperature-readout corresponding to the temperature at said second probe-environment;
- said converting means comprising means for converting said second temperature-signal to a second pressure-readout corresponding to the pressure at said second probe-environment;
- said transposing means further comprising means for transposing said first probe-signal and said second probe-signal to a difference temperature-signal;
- superheat-circuit means, activated by said difference temperature-signal, for producing a control signal;
- said control signal being adapted to control the normalizing of a refrigeration system.

4. The combination for producing an output signal whose value is a function of an input signal in accordance with a preselected segmented curve, wherein successive segments of said curve are connected to each other at an end point common to said successive segments comprising:
- means, comprising a plurality of segment generators, for synthesizing said segmented curve;
- selected said segment generators being associated with a respective segment of said segmented curve;
- each of said segment generators comprising means for causing a portion of its output waveform to have the same slope as its associated segment;
- means for causing said portion of said output waveform of said segment generators to pass through the end-points of its associated segment.

5. The combination of claim 4, including means for causing the composite output waveform of said plurality of segment generators to include said segmented curve.

6. The combination of claim 5, including means for limiting the output waveforms of each of said segment generators to its associated segment.

7. The combination comprising:
- temperature-sensitive means, comprising a first probe, for producing a first probe-signal corresponding to the temperature at a first probe-environment where there is a pressure/temperature relationship;
- means for transposing said first probe-signal to a first temperature signal;
- means for transforming said first temperature-signal to an absolute temperature-readout corresponding to the temperature at said probe-environment;
- a second temperature-sensitive means, comprising a second probe, for producing a second probe-signal corresponding to the temperature at a second probe-environment where there is the same pressure/temperature relationship;
- said transposing means comprising means for transposing said second probe-signal to a second temperature-signal;
- said transforming means comprising means for transforming said second temperature-signal to a second absolute temperature-readout corresponding to the temperature at said second probe-environment;
- said transposing means comprising means for transposing said first probe-signal and said second probe-signal to a difference temperature signal;
- said transforming means comprising means for transforming said difference temperature-signal to a difference temperature readout;
- superheat-circuit means, activated by said difference temperature-signal, for causing said superheat-circuit means to produce a control-signal;
- whereby said control-signal may be used to control the automatic charging of a refrigeration system;
- alternative means for converting said temperature-signals to pressure readouts corresponding to the pressures at said probe-environment;
- said converting means comprising generator means for synthesizing a segmented waveform corresponding to said pressure/temperature relationship;
- said synthesized segmented waveform having a plurality of segments, each of said segments having segment characteristics comprising a slope and end-points, adjacent said segments, having one substantially identical end-point;
- said generator means comprising a like plurality of segment generators;
- each of said segment generators comprising means for causing the slope of its synthesized segment to have the same slope as its associated segment, and means for causing its synthesized segment to pass through the end-points of its associated segment;
- means for combining the synthesized output waveforms of said plurality of segment generators to form said synthesized segmented waveform.

8. The combination of claim 7, comprising means for substituting a different plurality of generator means for synthesizing a different pressure/temperature curve corresponding to a different pressure/temperature relationship.